United States Patent
Asano et al.

[15] 3,688,411
[45] Sept. 5, 1972

[54] WIDE RANGE DIMENSION MEASURING APPARATUS

[72] Inventors: Hiroaki Asano; Masao Ohtsu, both of Kariya, Japan

[73] Assignee: Toyoda Koki Kabushiki Kaisha, Asahi-machi, Kariya-shi, Aichi-ken, Japan

[22] Filed: April 7, 1970

[21] Appl. No.: 26,334

[30] Foreign Application Priority Data

April 26, 1969 Japan..................44/32560

[52] U.S. Cl. ............33/143 L, 33/148 H, 33/147 N
[51] Int. Cl. .........................G01b 5/08, G01b 5/10
[58] Field of Search....33/143 R, 143 M, 143 L, 174 M, 33/147 R, 147 L, 147 N, 148 R, 148 H

[56] References Cited

UNITED STATES PATENTS

| | | |
|---|---|---|
| 3,568,372 | 3/1971 | Asano.....................33/148 R |
| 2,728,992 | 1/1956 | Frey........................33/148 R |
| 3,476,481 | 11/1969 | Lemelson................33/143 R |

*Primary Examiner*—Leonard Forman
*Assistant Examiner*—Paul G. Feldes
*Attorney*—Wenderoth, Lind & Ponack

[57] ABSTRACT

Measuring apparatus for measuring the diameter of a workpiece over an extended range thereof being provided with first and second measuring members to engage the workpiece and respectively being mounted on the first and second support members. The first support member is slidably mounted on a tilting base and the second support member is slidably mounted on the first support member. A first means is provided to move the first support member relative to the tilting base and a second means is provided to move the second support member relative to the first support member in a direction opposite to that of the first support member by an amount twice that of the movement of the first support member whereby the spacing between said measuring members is variable without changing the center position of said spacing.

7 Claims, 3 Drawing Figures

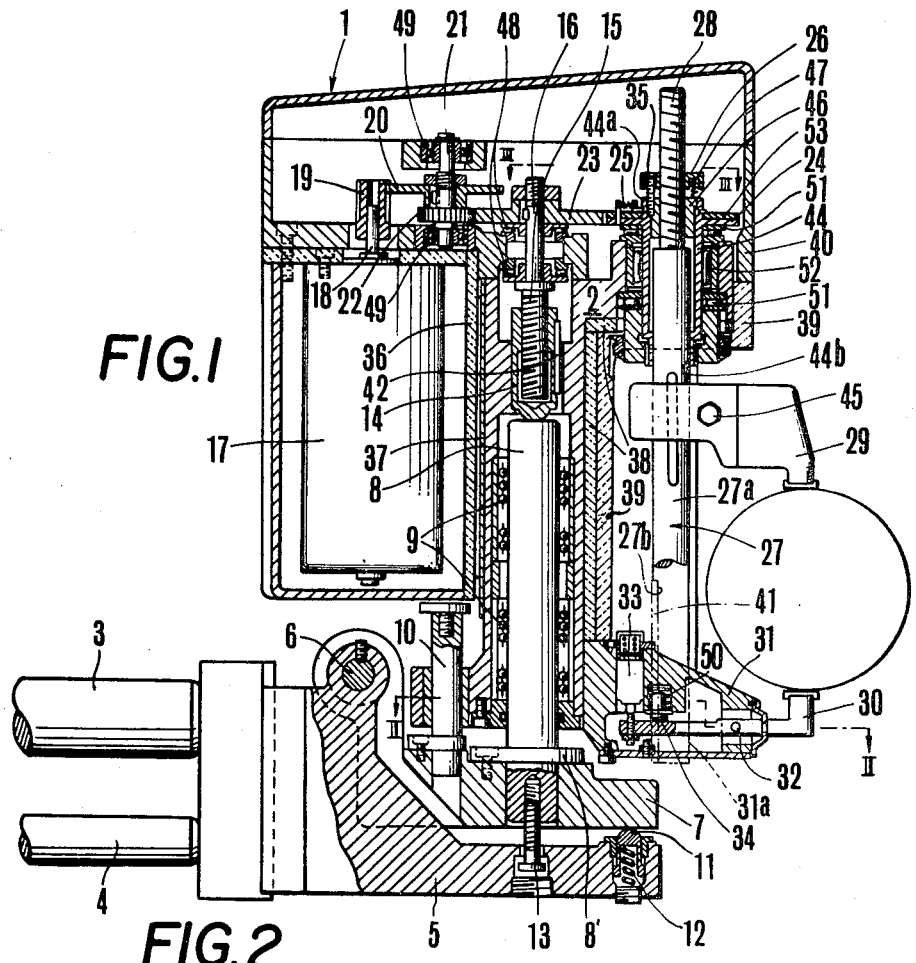
FIG.1
FIG.2
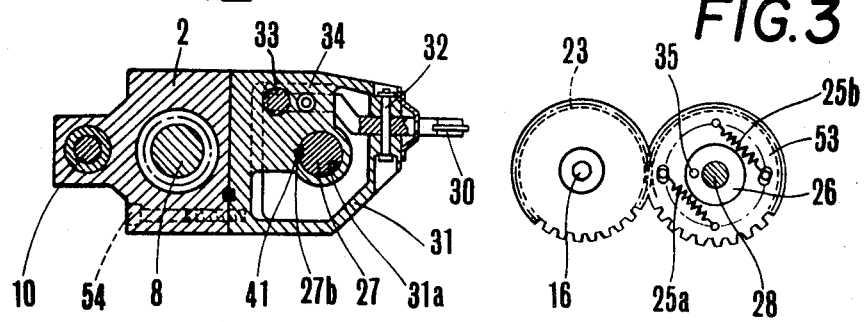
FIG.3

WIDE RANGE DIMENSION MEASURING APPARATUS

BACKGROUND OF THE INVENTION

This invention relates to a measuring apparatus for measuring the diameter of a workpiece over an extended range In machining a workpiece to a definite diameter, for example by means of a grinding wheel, it is necessary to measure the diameter continuously in response to a decrease in the same caused by the grinding operation. For this purpose, a measuring apparatus is used having a pair of measuring members adapted to engage the periphery of the workpiece. Whenever the diameter of the workpiece to be finished is varied, it is necessary to vary the spacing between the measuring members. Thus, a need existed to provide a measuring apparatus which can accurately measure the diameter of the workpiece and which can be quickly present to measure various changing diameters.

A prior art measuring apparatus includes a pair of measuring members and after manually adjusting the spacing between holders of the measuring members by moving one relative to the other to a spacing corresponding to the desired diameter by using a master gauge or piece which has been accurately finished to the desired dimension, the holders being fixedly secured to a guide surface of a measuring head. The relatively movable or lower measuring member is pivotally mounted on its holders, and one end of said movable lower measuring member is engaged against a displacement detector such as a differential transformer and the like, so as to detect the motion of the other end thereof occurring through the change being effected in the workpiece diameter by the grinding operation, and to generate a sizing signal when the workpiece diameter becomes equal to that of that master gauge. With such a measuring device it is impossible to automatically measure an incorrect diameter different from the diameter of the master gauge. Whenever the diameter of the workpiece is varied, it is necessary to manually readjust the spacing between the pair of measuring members by means of the master gauge corresponding to the varied diameter of the workpiece, thus requiring troublesome adjustment.

As a result, a measuring apparatus recently has been developed, as disclosed in applicants' previous U.S. Pat. No. 3,536,372, issued Mar. 1, 1971, which can automatically measure different diameters of workpieces by adjusting the spacing of the measuring members without using the different master gauges. This adjustment is performed by sliding a pair of measuring members along a pilot bar toward and away from each other with respect to the center of the workpiece to be measured so as to vary the distance between the measuring members. For this purpose, corresponding portions or ends of separate holders for the respective measuring members are meshed respectively with lefthand and right-hand screw threads of respective reference feed screw rods disposed in parallel with the pilot bar which feed screws are rotated as for example by a pulse motor in accordance with means therein for generating dimension-establishing command signals, thus enabling the distance between measuring members or feelers to be changed to the desired values. The above-patented arrangement, however, involves such problems that commulatively doubles the effect of errors of pitch tolerances of the left and right hand screw threads which cause inaccuracy in the spacing between measuring members. Further the backlash between the holder and the movable pilot bar and the non-lineation of the pilot bar cause the measuring members to incline whereby the cummulative tolerance-induced angle of such inclination results in an erroneous relative position between the feed rod and the holder in proportion to the distance between the axis of the feed rod and the point of contact between the measuring members and the workpiece being measured. All of these factors, of course, greatly affect theaccuracy of the measuring operation.

SUMMARY OF THE INVENTION

It is, therefore, an object of this invention to provide an improved measuring apparatus capable of quickly and accurately presetting the distances between measuring members.

A further object of this invention is to provide an improved measuring apparatus capable of greatly alleviating errors due to the cummulative tolerance-induced inclination of the measuring members.

Another object of this invention is to provide an improved measuring apparatus wherein the accuracy of the measuring operation is not affected by inaccuracies of driving means for measuring members such as backlash between meshing gears.

In accordance with this invention, means is provided to move one of the measuring members in a direction opposite to that of the other in an amount equal to twice that of the movement of the other, whereby to vary the spacing between the measuring members without changing the center of the spacing.

A preferred embodiment of this invention comprises a bracket, a tilting base pivotally mounted on the bracket, a pilot bar secured to the tilting base, a measuring head slidably mounted on the pilot bar, a block secured to the measuring head, a lower measuring member pivotally carried by the block, a displacement detector associated with the lower measuring member, a feed rod disposed in parallel with the pilot bar, an uppermost end of the feed rod being slidably journalled in the measuring head and the lowermost end of the feed rod being slidably journalled in the block, an upper measuring member carried in a non-pivotal manner by the feed rod, means to move the feed rod relative to the measuring head in a direction opposite to that of the movement of the measuring head by an amount twice that of the movement of the measuring head whereby the spacing between the upper and lower measuring members is variable without changing the center of the spacing.

BRIEF DESCRIPTION OF THE DRAWING

The foregoing and other objects of the present invention will become fully apparent from the following description of a preferred embodiment of the present invention with reference to the accompanying drawings in which:

FIG. 1 is a longitudinal sectional view of a measuring apparatus according to this invention;

FIG. 2 is a sectional view taken along a lineII—II in FIG. 1; and

FIG. 3 is a sectional view taken along a line III—III in FIG. 1.

DESCRIPTION OF THE PREFERRED EMBODIMENT

Referring now to the accompanying drawings, the measuring apparatus shown in FIG. 1 comprises a measuring head 1 including a main body 2 slidably mounted on a tiltable base 7 and limited in its slidable movement by a set screw and pin assembly 10 which is disposed parallel to the pilot bar 8 upon the tiltable base 7, and which is slidably engaged by the main body 2. The tiltable base 7 is pivotally mounted by a pin 6 on a reciprocating bracket 5 that is fixedly connected to a guide rod 3 and a piston rod 4 of a periodically operated hydraulic actuator not shown. The main body 2 is slidably mounted on a pilot bar 8 through bearings 9. A plunger 11, slidably mounted in the bracket 5, is urged against the lower surface of the tiltable base 7 by means of a spring 12 so as to maintain the measuring head 1 in a balanced position. The pilot bar 8 has at the lower portion thereof an integral flange 8' which is secured to tiltable base 7 and a bolt 13 is threaded into the bottom surface of pilot bar 8 to limit relative movement of tiltable base 7 and thus pilot bar 8 with respect to bracket 5.

The upper end of the pilot bar 8 is normally engaged in an axial manner by the lower end of a feed nut 14 which is keyed to main body 2, permitting relative axial movement therebetween, while preventing relative rotation therebetween. The feed nut 14 meshes with righthand threads 15 of a feed rod 16 which is rotatably mounted in main body 2 by thrust bearings 48. 16 is gear 23 is keyed to the upper end of the feed rod 16. A gear 19 is secured to the rotary shaft 18 of a pulse motor 17, which in turn is secured to one side of main body 2 through a reflector 37 and a heat insulator 36, whereby gear 19 intermeshes with gear 20 mounted on an intermediate shaft 21, the latter being rotatably journalled by bearings 49 in the main body 2. A gear 22 mounted on the intermediate shaft 21 meshes with said gear 23 on feed rod 16 to transmit a definite angle of rotation to feed rod 16. Thus, as feed rod 16 is rotated through definite angle by the operation of pulse motor 17, feed nut 14 is moved in the vertical direction because its rotation relative to main body 2 is prevented by key 42. When feed nut 14 is moved downwardly relative to the feed rod 16 by the rotation of feed rod 16 in one direction, the main body 2 will be raised along pilot bar 8 by the amount equal to the downward movement of feed nut 14 as the lower end thereof is normally held urged against the upper end of pilot bar 8.

Conversely, when feed rod 16 is rotated in the opposite direction, the feed nut 14 is raised relative to said rod 16 and main body 2 descends by its own weight.

A block 31 is secured in an initially pre-adjusted vertical position, as by means of one or more bolts 54 (FIG. 2), to the lower end of main body 2. A lower measuring member 30 is pivotally mounted on block 31 by a pin 32, the inner or rearward end of said measuring member 30 being maintained in contact with a differential transformer 33 mounted on block 31 to detect the displacement of said rearward end portion. Upon predetermined movement of the movable measuring member 30, the transformer 33 generates predetermined voltage, hereinafter referred to as a sizing signal, to change the feed rate of a tool such as the grinding wheel. Because a pusher or plunger 34, mounted in the block 31, is urged by a spring 50 against the inner end of lower measuring member 30, the lower measuring member 30 is urged to rotate in a counter-clockwise direction so as to provide a predetermined impact pressure of the measuring member or feeler with respect to the workpiece being measured. Further, a sleeve 44 is rotatably mounted in main body 2 through thrust bearings 51 and needle bearing 52. A gear 24 having the same number of teeth as gear 23 and meshing therewith is integrally formed or fixedly mounted on the upper end of sleeve 44. A gear 53 having also the same number of teeth as gear 23 and meshing therewith is rotatably mounted on the upper cylindrical portion 44a of sleeve 44 to abut against the upper surface of gear 24, and as shown in FIG. 3, springs 25a and 25b are interposed between gear 24 and gear 53 to impart a relative torque to these gears, thus eliminating the backlash between intermeshing gears 23 and 24. A feed rod 27 is provided and includes an intermediate portion 27a thereof extending through a bearing 44b in sleeve 44, and a lower portion extending through bearing 31a in block 31. Thus, feed rod 27 is supported in parallel with pilot bar 8. Feed rod 27 is prevented from rotating by a key 41 fitted in a keyway 27b cut in the portion 27a, but is permitted to slide in the axial direction within said bearing 44b. A lefthand threaded rod portion 28 coaxially projects from the upper end of the portion 27a. The pitch of the lefthand threads is twice as large as that of the righthand threads 15 of feed rod 16, said lefthand threads engaging a feed member 46 secured to sleeve 44. An upper measuring member 29 confronting the lower pivotal measuring member 30 is secured to feed rod 27 by means of a bolt 45, and can be adjustable in the vertical direction thereof. A backlash eliminating nut 26 is provided to engage the lefthand threads on the threaded portion 28. Nut 26 slidably receives a pin 35 secured to feed member 46, and a compression spring 47 is interposed between said nut 26 and feed member 46.

A heat insulator 38 is provided to prevent the heat generated by the grinding operations from being transmitted to feed rod 16 and other members, and covers 39 and 40 are provided to enclose the main body to prevent coolant or particles produced by the grinding operation from entering into the main body. Heat insulator 38 cooperates with aforementioned heat insulator 36 and reflector 37 to prevent the heat from decreasing the accuracy of the measuring operation.

OPERATION

The measuring apparatus of this invention constructed as above described operates in the following manner. At first, it is necessary to accurately align the operating point of differential transformer 33 at which a signal representing the desired diameter is generated relative to a predetermined reference point. This alignment is performed by using a master gauge or piece. More specifically, a master piece which has been finished to have the desired outer diameter is supported between conventionally aligned centers of the grinding machine in a predetermined relation and then the measuring apparatus is periodically moved toward the master piece by the hydraulic actuator so that the upper and lower measuring members are aligned essentially with the diameter of the master piece. The vertical position of the lower measuring member 30 is so adjusted through the vertical movement of the main body 2 due to the rotation of the pulse motor 17 that the lower measuring member 30 engages the lower surface of the master piece with a light pressure due to the force of spring 50. The vertical position of the upper measuring member 29 is adjustable relative to the feed rod 27, and once adjusted the upper measuring member 29 as carried by rod 27 engages the upper surface of the master piece with a light pressure due to the tendnecy of the main body 2 to rotate in a clockwise direction around the pin 6 due to gravity, but which is opposed or substantially countered by the spring 12 acting upwardly against differential member 11. Under these conditions the operating point of differential transformer 33 is adjusted to provide the sizing signal representing the desired diameter, after which the measuring apparatus is retracted and the master piece is removed from the centers. Then the workpiece will be supported between the centers and the measuring apparatus will be advanced. The grinding wheel of the grinding machine (not shown) will then be advanced toward the workpiece so as to perform any further needed grinding operation on the workpiece. When the diameter of the workpiece becomes equal to that of the master piece, the differential transformer 33 of the measuring apparatus will generate the sizing signal. The grinding wheel will be retracted responsive to the sizing signal. If the desired diameter of the finished workpiece is different from the diameter of the master piece, using the nominal diameter of the master piece as the reference, a pulse signal corresponding to the difference between this reference and the desired diameter of the finished workpiece is applied to the pulse motor 17 to respectively drive feed rod 16 and feed member 46 secured to sleeve 44 by means of the gear train described hereinabove. For the sake of description, it is assumed that the pulse motor is rotated in the counterclockwise direction when viewed from the upper portion in FIG. 1, whereby the feed rod 16 will also be rotated in the same direction through the gear train so as to move feed nut 14 downwardly. As a result, main body 2 is moved upwardly along pilot bar 8 to raise block 31 secured to main body 2. Thus the movable measuring member 30 is moved upwardly relative to the tiltable base 7 through a distance corresponding to the number of pulse signals applied to the pulse motor 17. Further, as feed member 46, which is secured to sleeve 44, is rotated in the clockwise direction through the same angle as feed rod 16 by the action of intermeshing gears 23 and 24, the feed rod 27 is moved downwardly carrying with it the non-pivotally mounted upper member 29. However, as described above, since the pitch of the lefthand threads of threaded portion 28 is twice as large as that of the righthand threads 15 of feed rod 16, the upper measuring member 29 moves downwardly relative to said body 2 over a distance twice as large as that of the movement of the lower measuring member 30. Thus it is possible to vary the spacing between the pair of measuring members without changing the position of the center of the spacing between the upper measuring member 29 and the lower measuring member 30, the latter positioning so as to cause the differential transformer 33 to generate the sizing signal. Subsequent to this setting, the workpiece having the smaller diameter is supported between the centers of the grinding machine and the measuring apparatus is advanced. Then the grinding wheel is moved toward the workpiece. When the diameter of the workpiece becomes equal to the desired diameter, an output from the differential transformer provides a signal through a comparator circuit not shown in the drawing, but such as that disclosed in applicants U.S. Pat. No. 3,568,372 which shows that the workpiece has a diameter of the predetermined dimension.

In this manner, in accordance with this invention, since by the vertical movement of feed rod 27 upper measuring member 29 secured to feed rod 27, which in turn is slidably journalled by the main body 2 of the measuring apparatus, is moved toward and away from the lower measuring member 30 as pivotally mounted on the block secured to main body 2, any error of the measuring operation is caused only by the pitch accuracy of the lefthand threads of shaft 28 and the accuracy of the sliding motion of the feed rod 27, thus the accuracy of the measuring operation is never influenced by the pitch accuracy of the righthand threads 15 of feed rod 16 and/or the accuracy of the sliding motion of main body 2 along pilot bar 8.

Furthermore, as it is possible to greatly reduce the distance between the axis of feed rod 27 and the contact point of the upper measuring member 29 relative to the workpiece to be measured, it is possible to minimize the adverse effect of the inclination of the relatively upper measuring member 29, which is unavoidable due to the inherent clearance between the intermediate portion 27a and lower portion of feed rod 27, which portions are adapted to slidably cooperate with bearings 44b and 31a. Further, since it is possible also to increase the distance between said bearings supporting feed rod 27, the inclination of the upper measuring member 29 caused by said clearance is greatly reduced. Thus, notwithstanding the variation n spacing between the two measuring members or feelers, an accurate detection of the predetermined diametrical dimension can always be this particular with this device.

While the invention has been shown and described in terms of a preferred embodiment thereof, it is to be understood that this invention is not limited to this particular embodiment and that many changes and modifications will be obvious to one skilled in the art without departing from the true spirit and scope of the invention. (30) 25, 26, 28)

What is claimed is:

1. A measuring apparatus for measuring the diameter of a centerline-supported workpiece of varying diameters over an extended range comprising in combination a generally horizontally disposed bracket (5); a tilting base (7) pivotally mounted about a horizontal pivot for limited tiltable movement on and relative to said bracket; a first support means (2), with first means thereon (22, 23, 14, 16, 9), for slidably mounting and moving said first support means for generally vertical movement on and relative to said tilting base (7); a pair of opposed coacting measuring members (29, 30) for determining a diameter measurement; a first measuring member (3)) is pivotally mounted on said first support means (2); displacement detector means (33) including a displacement detector mounted on said first support means (2); displacement detector mounted on said first support means (2); displacement detector means (33) including a displacement detector mounted on said first support means (2) to detect the movement of said first measuring member relative to said first support means (2); a second support means (27, 44) being mounted for movement on and relative to said first support means 2; second means (53, 24, 25. 27. 29) to mount and move said second support means (27, 44); a second measuring member (29) rigidly mounted on and for movement with said second support means (27, 44); said first means (22, 23, 14, 16, 9) including means for moving said first support means relative to said tilting base in a first direction, and said second means (53, 24, 25, 26, 28) for moving said second support means relative to said first support means (2) in a second direction opposite to said first direction at a rate twice that of said first support means so that said measuring members are capable of relative movement toward and away from each other to vary the spacing therebetween to measure a diameter of said workpiece without changing the center location of said spacing which center coincides with the centerline of said workpiece being measured.

2. A measuring apparatus as defined in claim 1 wherein said first support means (2) includes a pilot bar (8) secured at one end transversely to said tilting base (7) and having an upstanding opposite free end; said first support means also including a main body (2) slidably mounted on said pilot bar (8) over said free end, a block member (31) secured to a lower portion of said main body and on which said pivotally mounted first measuring member (30) is operatively mounted; said second support means including an upstanding feed rod (27) disposed in parallel with said pilot bar (8) and further including means (44, 44a, 44b, 46) for mounting the uppermost end of said feed rod (27) to be slidably journalled in said main body and opposite said block (31), and the lowermost end of said feed rod (27) to be slidably journalled in an aligned aperture in said block (31); said first support means (2) by including means (14, 15, 16, 23) to move said main body (2) relative to said tilting base (7) effects movement along said pilot bar (8) in an axial direction thereof; and means constituting part of said second means, to move said parallel disposed feed rod (27) relative to said main body (2) in a direction opposite to that of the movement of said main body (2) and by an amount twice that of the movement of said main body, thereby to effectively vary the spacing between said pair of coacting measuring members.

3. A measuring apparatus as defined in claim 2 wherein said means for moving said main body (2) includes driving means comprising a cooperatively threaded elongated nut member (14) and a second feed rod (16) having one end projecting from said nut member, and with means to guide said nut member (14) to slide axially only and to preclude it from rotating with respect to said main body (2), one end of said nut member (14) abutting said upstanding free end of said pilot bar (8); said second feed rod (16) being cooperatively and rotatably supported by said main body (2) while being rotatably and threadedly received in said nut member (14); and said means for moving said main body relative to said tilting base (7) further including drive means to operatively rotate said second feed rod (16).

4. A measuring apparatus as defined in claim 3 further including means to mount said first-mentioned feed rod (27) to preclude rotation about its axis while permitting said axially slidable movement; said feed rod (27) further including a threaded portion (28) connected to said uppermost end of said first mentioned feed rod (27); a threaded sleeve (44, 46) surrounding portions of said first-mentioned feed rod (27) and threaded portion (28) with means for rotatably but axially fixedly journalling same in said main body (2), an upper end portion (46) of said sleeve being threadedly engaged with the threads of said threaded portion (28); and said means to move said parallel disposed first-mentioned feed rod (27) including rotatable drive means to rotate said threaded sleeve (44, 46) responsive to the drive imparted to rotate said second feed rod (16).

5. A measuring apparatus as defined in claim 4 wherein the threads of said second feed rod (16) mating with said nut member (14), and the threads of said threaded portion (28) of the first-mentioned feed rod (27) mating with said threaded sleeve (44, 46) are opposite handed, and the thread pitch of said first mentioned feed rod's threaded portion (28) is twice as large as those threads of said second mentioned feed rod (16) so as to move said first mentioned feed rod (27) carrying said non-pivotally mounted measuring member (29) in a direction opposite to that of the movement of said main body (2) and by an amount twice as large as the movement of said main body (2) as moved responsive to the relative rotation of said second feed rod (16) and nut member (14) effecting movement of the main body (2) on said pilot bar (8).

6. A measuring apparatus as defined in claim 4 wherein said second feed rod (16) and said first mentioned feed rod (27) via said threaded sleeve (44, 46) are operatively connected by gears of a gear train so as to operate substantially simultaneously to effect concurrent opposite relative movement of said pair of measuring coacting members (29) and (30) during active measuring of a workpiece.

7. A measuring apparatus as defined in claim 4 wherein said displacement detector is of the electrical differential transformer type and adjustable to generate an electrical signal representing the diameter of a masterpiece to which the diameter of the workpiece is to be correspondingly changed, and to subsequently generate signals to effect operation of the drive means for moving the pair measuring members a predetermined distance so that the spacing therebetween corresponds to the desired diameter of the master piece.

* * * * *